(12) United States Patent
Gussen et al.

(10) Patent No.: US 10,697,226 B2
(45) Date of Patent: Jun. 30, 2020

(54) METHOD FOR AUTOMATIC CLOSURE OF A VEHICLE TAILGATE

(71) Applicant: FORD GLOBAL TECHNOLOGIES, LLC, Dearborn, MI (US)

(72) Inventors: Uwe Gussen, Huertgenwald (DE); Christoph Arndt, Moerlen Rheinland-Pfalz (DE); Frederic Stefan, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 248 days.

(21) Appl. No.: 15/406,176

(22) Filed: Jan. 13, 2017

(65) Prior Publication Data
US 2017/0204651 A1 Jul. 20, 2017

(30) Foreign Application Priority Data
Jan. 15, 2016 (DE) .................. 10 2016 200 422

(51) Int. Cl.
*E05F 15/77* (2015.01)
*B60J 5/10* (2006.01)
(Continued)

(52) U.S. Cl.
CPC ............... *E05F 15/77* (2015.01); *B60J 5/10* (2013.01); *E05F 15/76* (2015.01);
(Continued)

(58) Field of Classification Search
CPC ..... E05F 15/77; E05F 2015/763; E05F 15/71; E05F 15/76; E05Y 2900/548;
(Continued)

(56) References Cited

U.S. PATENT DOCUMENTS 8,794,689 B2   8/2014  Bauer
9,388,623 B2   7/2016  Ette et al.
(Continued)

FOREIGN PATENT DOCUMENTS

CN   101660382 A   3/2010
CN   102704784 A   10/2012
(Continued)

OTHER PUBLICATIONS

German Search Report dated Jul. 25, 2016 for German Application No. 102016200422.0, 4 pgs.
(Continued)

*Primary Examiner* — Hunter B Lonsberry
*Assistant Examiner* — Mathew Franklin Gordon
(74) *Attorney, Agent, or Firm* — Brooks Kushman P.C.; Frank Lollo

(57) ABSTRACT

The disclosure concerns a method for the remote-controlled operation of a tailgate of a motor vehicle. A sensor arrangement of the motor vehicle detects environmental data of the motor vehicle. A control apparatus of the motor vehicle triggers the opening of the tailgate on receiving a wireless opening signal from an operator and triggers the closing of the tailgate on receiving a wireless closing signal from an operator. The control apparatus checks for the presence of at least one closure condition of the tailgate that is independent of the wireless closing signal based on the environmental data detected by the sensor arrangement during opening of the tailgate, and if the closure condition is present, the control apparatus triggers the closing of the tailgate.

17 Claims, 2 Drawing Sheets

(51) Int. Cl.
*E05F 15/76* (2015.01)
*G07C 9/00* (2020.01)
*E05F 15/73* (2015.01)
*E05F 15/71* (2015.01)

(52) U.S. Cl.
CPC ..... *G07C 9/00174* (2013.01); *G07C 9/00571* (2013.01); *E05F 15/71* (2015.01); *E05F 2015/763* (2015.01); *E05Y 2400/44* (2013.01); *E05Y 2400/45* (2013.01); *E05Y 2400/53* (2013.01); *E05Y 2400/85* (2013.01); *E05Y 2400/852* (2013.01); *E05Y 2900/532* (2013.01); *E05Y 2900/546* (2013.01); *E05Y 2900/548* (2013.01); *G07C 2009/00769* (2013.01); *G07C 2209/64* (2013.01)

(58) Field of Classification Search
CPC ......... E05Y 2900/546; E05Y 2900/532; E05Y 2400/852; E05Y 2400/85; E05Y 2400/53; E05Y 2400/45; E05Y 2400/44; B60J 5/10
See application file for complete search history.

(56) References Cited

U.S. PATENT DOCUMENTS

| | | | |
|---|---|---|---|
| 9,689,982 | B2 | 6/2017 | Herthan |
| 9,830,754 | B2* | 11/2017 | Kim ................. G07C 9/00007 |
| 2010/0057308 | A1 | 3/2010 | Hill |
| 2010/0213732 | A1* | 8/2010 | Ablabutyan .......... B60P 1/4471 296/56 |
| 2014/0022052 | A1* | 1/2014 | Lim ....................... G08C 17/02 340/5.61 |
| 2014/0156112 | A1* | 6/2014 | Lee ....................... G08C 17/00 701/2 |
| 2014/0207344 | A1* | 7/2014 | Ihlenburg ................ E05F 15/73 701/49 |
| 2015/0284984 | A1 | 10/2015 | Kanter et al. |
| 2015/0345205 | A1 | 12/2015 | Gunreben et al. |
| 2015/0361711 | A1* | 12/2015 | Baumann ............... E05F 15/70 49/29 |

FOREIGN PATENT DOCUMENTS

| | | |
|---|---|---|
| CN | 103774950 A | 5/2014 |
| CN | 104278907 A | 1/2015 |
| CN | 104903159 A | 9/2015 |
| CN | 104903160 A | 9/2015 |
| DE | 102010024931 A1 | 1/2011 |
| DE | 102009058864 A1 | 6/2011 |
| DE | 102012013065 A1 | 1/2014 |
| EP | 1836075 A1 | 9/2007 |

OTHER PUBLICATIONS

Chinese Office Action and English translation for Application No. 201710021656.5, dated Aug. 5, 2019, 13 pages.

* cited by examiner

METHOD FOR AUTOMATIC CLOSURE OF A VEHICLE TAILGATE

CROSS-REFERENCE TO RELATED APPLICATIONS

This application claims foreign priority benefits under 35 U.S.C. § 119(a)-(d) to DE 10 2016 200 422.0 filed Jan. 15, 2016, which is hereby incorporated by reference in its entirety.

TECHNICAL FIELD

The disclosure concerns a method for the remote-controlled operation of a tailgate of a motor vehicle.

BACKGROUND

A method for remote-controlled operation of a tailgate of a motor vehicle is known from DE 10 2010 024 931 A1. A sensor arrangement of the motor vehicle detects environmental data of the motor vehicle. A control apparatus of the motor vehicle triggers opening of the tailgate on receiving a wireless opening signal from an operator.

A method for actuating a tank closure of a motor vehicle is known from DE 10 2009 058 864B4, with which an operator triggers the opening and closing of the tank closure by approaching or moving away again from a proximity sensor of the motor vehicle sufficiently. The operator must previously activate a sensor device.

From the prior art, it is known to open tailgates of motor vehicles by means of a remote controller, for example based on an encoded opening signal transmitted by means of radio or infrared, and likewise to close tailgates by means of an encoded closing signal. Such opening of the tailgate both here and below can involve only the unlocking of a lock of the tailgate, wherein a suitable closure arrangement is then pulled from a corresponding lock latch of the tailgate lock, or even the especially fully active opening of the tailgate- which the unlocking precedes, which in turn can be driven by a motor or by a spring structure. In this case on the one hand the closure arrangement can be disposed on the tailgate and the lock latch can be disposed on a frame for the tailgate. Equally, the closure arrangement can be disposed on the tailgate and the lock latch can be disposed on such a frame.

It is also known from the prior art to produce and use such opening signals and closing signals in unencoded form. Thus, for example, a capacitive proximity sensor can be used and a person triggers an opening or closing signal by being in the detection region thereof. The signal can also be output as a voice signal. However, as such an opening or closing signal is unencoded as a rule, an additional safety feature is added. For example, it is additionally detected whether an electronic motor vehicle key or a different authorization means is sufficiently close, which can for example be detected by means of RFID (radio-frequency identification).

Especially during the opening of such tailgates by remote controls, there is the risk of unintentional opening. Because a single operation of a corresponding button on a motor vehicle key with remote control functionality, or a "key fob", is generally sufficient to trigger the opening, such an operation can also be carried out accidentally, especially if the motor vehicle key is in a pocket with other objects or can otherwise come into random contact with other objects. Especially because such a remote controller also has a significant range, there is a serious probability that the operator is at such a great distance from the motor vehicle or the tailgate at the moment of the inadvertent triggering of the opening that the inadvertently triggered opening remains unnoticed. On the other hand, there is the significant risk of theft from the interior of the motor vehicle or of damage by ingress of rain or snow if the operator is away from the vehicle for a long time while the tailgate is unlocked or even fully open.

EP 1 836 075 B1 describes the provision of a control center that is connected for control technology purposes between a remote-control apparatus and a device to be remotely controlled of a vehicle. Such a control center can carry out a resolution, for example when multiple potentially conflicting control commands are received from remote control apparatuses.

DE 10 2012 013 065 A1, which is considered to be the closest here, describes a tailgate of a motor vehicle that can be opened by means of a remote controller. The motor vehicle further comprises a proximity sensor, with which on the one hand for example a foot movement of an operator can be detected, which likewise triggers the opening of the tailgate ("beer box switch"). Said proximity sensor can also be used to determine that the motor vehicle is for example in a car wash, in which opening the tailgate should be prevented, for which reason it is inhibited. DE 10 2012 013 065 A1 does not provide a particular procedure for the case in which the tailgate has already opened, however.

SUMMARY

Based on said prior art, it is the object of the disclosure to provide improved protection against the inadvertently triggered opening of a tailgate of a motor vehicle by a remote controller or opening for another reason that has not been considered or has been forgotten.

This object is achieved in relation to a method for the remote-controlled operation of a tailgate of a motor vehicle.

The method according to the disclosure is used for the remotely controlled operation of a tailgate of a motor vehicle. During this, a sensor arrangement of the motor vehicle detects environmental data of the motor vehicle. Such environmental data means any data that are detected from outside the motor vehicle. The interior of the motor vehicle also qualifies here as the environment of the motor vehicle. However, internal signals or data of the motor vehicle itself, such as the state of the ignition or control commands of an internal communications bus, do not fall within the term of environmental data. A control apparatus of the motor vehicle triggers the opening of the tailgate on receiving a wireless opening signal from an operator. The opening of the tailgate can include both the unlocking of a lock arrangement of the tailgate and also a full or partial opening movement of the tailgate. On receiving a wireless closing signal that the operator outputs, the control apparatus triggers the closing of the tailgate. A "signal" in the present sense means a signal that is actively wirelessly transmitted in the above sense. Such a signal can, for example, be output by a transmitter of electromagnetic waves. Such a signal can also be obtained by means of a proximity sensor, for example of a capacitive proximity sensor, as a result of an operator approaching a certain region of the motor vehicle sufficiently closely, for example by holding a foot under a rear bumper. Such a signal can also be output as a voice command. If an unencoded signal is output and in order to prevent misuse, at the same time there should be yet another condition, for example the electronic key of the motor vehicle or a mobile device should be sufficiently close, for which the detection can be carried out by means of RFID, for example.

It is possible that the opening signal is identical to the closing signal. However, the opening signal can also be different from the closing signal.

The method according to the disclosure is characterized in that the control apparatus checks for the presence of a closure condition of the tailgate based on the environmental data detected by the sensor arrangement when opening the tailgate, and that the control apparatus triggers the closing of the tailgate if the closure condition is present. Said checking can already start at the beginning of opening and can also be continued after completion of the opening of the tailgate. Alternatively, said checking can only start on completion of the opening of the tailgate. The closing of the tailgate can include, on the one hand, locking of the lock arrangement of the tailgate, possibly including pulling the tailgate into a pre-latching or main latching position of the lock arrangement with a pulling aid, and also, on the other hand, a closing movement of the tailgate from a fully or partly open state of the tailgate. To this extent, in particular this closing completely or partly reverses the previous opening.

In this way, even if opening the tailgate has already taken place, a check for the automatic re-closure of the tailgate can be carried out, so that at least the duration of the unintentional opening of the tailgate can be effectively limited. In this way, the risks arising from the inadvertent opening of the tailgate can also be minimized.

The operator preferably obtains information about the at least one closure condition when he triggers the opening signal. The closing movement is independent of a later closing signal that the operator can output at any time. After triggering a closing signal, the operator receives at least one of the following messages about the active closure conditions for example: "closing in 15 minutes", or "closing in the event of rain", or "closing in the event of a distance greater than 20 meters". The operator therefore knows which closure conditions are active once he triggers the opening signal. In a development, it is possible that the operator is only informed about the closure conditions for a 1st triggering of the opening signal and that the opening is only active in the event of a 2nd triggering. The active closure conditions can for example be displayed on a display or output audibly.

A preferred embodiment provides that the sensor arrangement comprises a signal receiver that receives the opening signal and the closing signal. The signal receiver preferably also detects at least partly the environmental data. In this way, the signal receiver can be provided with a particularly efficient dual use, on the one hand, for receiving the opening signal and the closing signal, and, on the other hand, for providing the data, using which decision shall be made about closing the tailgate based on the closure condition.

A further preferred embodiment is characterized in that the sensor arrangement comprises a proximity sensor for collision avoidance when moving the tailgate, that the control apparatus monitors the closing of the tailgate by means of the proximity sensor when carrying out closing of the tailgate and that the proximity sensor at least partly detects the environmental data. Such proximity sensors are used during automatic closing or opening of the tailgate to prevent a collision with a person or another obstacle, for example a ceiling, in the range of movement of the tailgate. Said "monitoring" when carrying out the closing consequently means that the closing movement is stopped if the risk of an impending collision of the tailgate is detected using the proximity sensor. An advantageous dual use is also envisaged for said proximity sensor as for the signal receiver with this embodiment.

The length of time that a tailgate remains open can likewise be relevant to the checking of automatic closing. It is therefore preferred that the checking of the closure condition is based on a timeout of a timer. Said timeout can in particular be combined with further decision factors, and in particular by reducing the threshold for the triggering of the closing of the tailgate with increasing time.

The location of the motor vehicle can also be a factor for the plausibility of a tailgate that is open for longer time. Thus, a tailgate that is open for a longer time in a known loading area or near the house of the vehicle owner is opened more intentionally than if the motor vehicle is in a car park. Therefore, the motor vehicle preferably comprises a position determination device that determines the location of the motor vehicle and a telecommunications device that accesses server data wirelessly. In particular, the server data can be stored on a server that is disposed far from the motor vehicle. It is then, preferably, also provided that the checking for the presence of the closure condition comprises a comparison of the determined location of the motor vehicle with server data for an environment of the motor vehicle. Using the location and the stored server data, it can then be determined how probable the intended opening of the tailgate is at said location.

Because longer opening of the tailgate can lead to damage, especially in the event of current or impending rain or snow, a preferred embodiment provides that the checking for the closure condition is based on current weather data. According to a first version, said current weather data can be determined by a suitable weather sensor of the motor vehicle, for example a rain sensor for triggering the windscreen wipers. Alternatively or additionally, said weather data can also be obtained from a weather data server based on the location determined by the position determination device. To this extent, said weather data can also be server data in the above sense.

A further preferred embodiment is characterized in that the sensor arrangement comprises a person distance sensor that detects a distance from the operator, and that the checking for the closure condition is based on the distance from the operator that is determined in this way. Such a person distance sensor can primarily be arranged for detecting objects and is only secondarily suitable for determining a distance from a person. In principle, with a stationary motor vehicle, an object detected as moving can be identified as a person. By way of example, in this sense, sensors for parking aids such as ultrasonic sensors as well as sensors for a blind spot assistant, for example based on radar or laser scanners, are considered for use as person distance sensors. Further possible types of sensor include by way of example sensors based on infrared, microwaves or lidar (Light Detection and Ranging). If identifying a person as an operator is not possible, any person detected by the person distance sensor can also be simply assessed as an operator. An interior or seat sensor that can detect the presence of a person in an interior of the motor vehicle, or specifically on a seat of the motor vehicle, can also be considered to be a person distance sensor.

Here it is further preferred that the checking for the closure condition is based on a change of the determined distance from the operator with time. It is thus not only important that the operator is detected at a certain distance, but also whether the operator remains at said distance, approaches the motor vehicle or moves further away from the motor vehicle. In this case, the presence of a closure condition is rather more likely to occur if the operator is further away from the motor vehicle, because as a rule the operator does not normally want to leave the motor vehicle with the tailgate open.

In addition to detecting the body of the operator, a mobile device associated with the operator can also be detected by the sensor arrangement. Such a mobile device can be a cell phone, a smartphone, a motor vehicle key for the motor vehicle or any other portable electronic unit of the operator. The association with the operator can for example be stored in a data memory of the control apparatus. The mobile device can also be the transmitter that outputs the opening signal and the closing signal to the control apparatus.

In particular, if the determination of the distance from the mobile device took place on a different transmission path than the transmission path by means of which the opening signal was transmitted from the transmitter to the control apparatus, this can provide information about whether opening the tailgate was intentional or not. It is therefore preferable that the sensor arrangement comprises an operating sensor that determines a distance from a mobile device associated with the operator and that the checking for the closure condition is based on the determined distance from the mobile device associated with the operator. In particular, if the mobile device is the transmitter, the determination of the distance from the mobile device preferably takes place with a time delay for the reception of the opening signal. Thus, if the opening signal was received at a point in time at which the transmitter was close to the maximum range thereof from the motor vehicle and the transmitter has since been moved further away from the motor vehicle, then a distance beyond said maximum range is determined by the operating sensor or the operating sensor can no longer detect the transmitter at all. In such a case, the closure condition can be met.

It is further preferred that the closure condition is based on a change with time of the determined distance from the mobile device associated with the operator, wherein the implementations for the preferred embodiment apply in the same way regarding the change with time of the determined distance to the operator.

In particular, if a number of factors are to be taken into account during the checking for the closure condition, it is preferred that the control apparatus determines a probability of intention to open of the operator and determines whether the determined probability of intention to open is below a predetermined probability limit. This is a heuristic approach and is a simulated probability specifically for said probability of intention to open that is determined from statistical empirical values etc. An exemplary method for determining such a probability of intention to open consists of checking a series of conditions and summing (or not summing) a percentage value depending on meeting the condition. For determination of the probability of intention to open, in principle and preferably all factors on which the closure condition can be based are considered as described above. In addition, the sensor arrangement can also check a trunk sensor that detects a trunk load, so that the checking for the closure condition is also based on the detected trunk load. A large remaining trunk load with the tailgate open—i.e. following which there is no unloading—indicates the presence of a closure condition.

In this case, it can in particular be that the closure condition exists if the determined probability of intention to open is less than the predetermined probability limit. In this case, a time component can be taken into account both by subtracting a value increasing with time from the probability of intention to open and also by increasing the predetermined probability limit with increasing time.

In addition to checking for a closure condition after opening the tailgate, there can also be a check before the opening of the tailgate for inhibition of the opening of the tailgate. An inhibition is also included among the closure conditions. It can then be that no opening of the tailgate takes place at all. This is particularly advantageous if a—normally short—delay is provided between the reception of the opening signal and the triggering of the opening of the tailgate. Such a preferred embodiment is characterized in that on reception of the opening signal the control apparatus checks for the presence of an inhibition condition of the tailgate based on the environmental data detected by the sensor arrangement, and that the control apparatus inhibits the opening of the tailgate if the inhibition condition is present.

The checking for the presence of said inhibition condition can proceed here to a large extent similarly to the checking for the presence of the other closure conditions, because inhibition of the opening of the tailgate and automatic closing are usually provided under essentially the same conditions. In particular, said inhibition condition can correspond to at least one of the other closure conditions.

Analogously to checking for the closure condition, it is also preferred that the inhibition condition exists if the determined probability of intention to open is below the predetermined probability limit.

Further features and advantages of the disclosure are revealed in the following description of an exemplary embodiment, which is to be considered non-limiting and which is described in detail below with reference to the figures. In the figures the following are shown schematically:

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
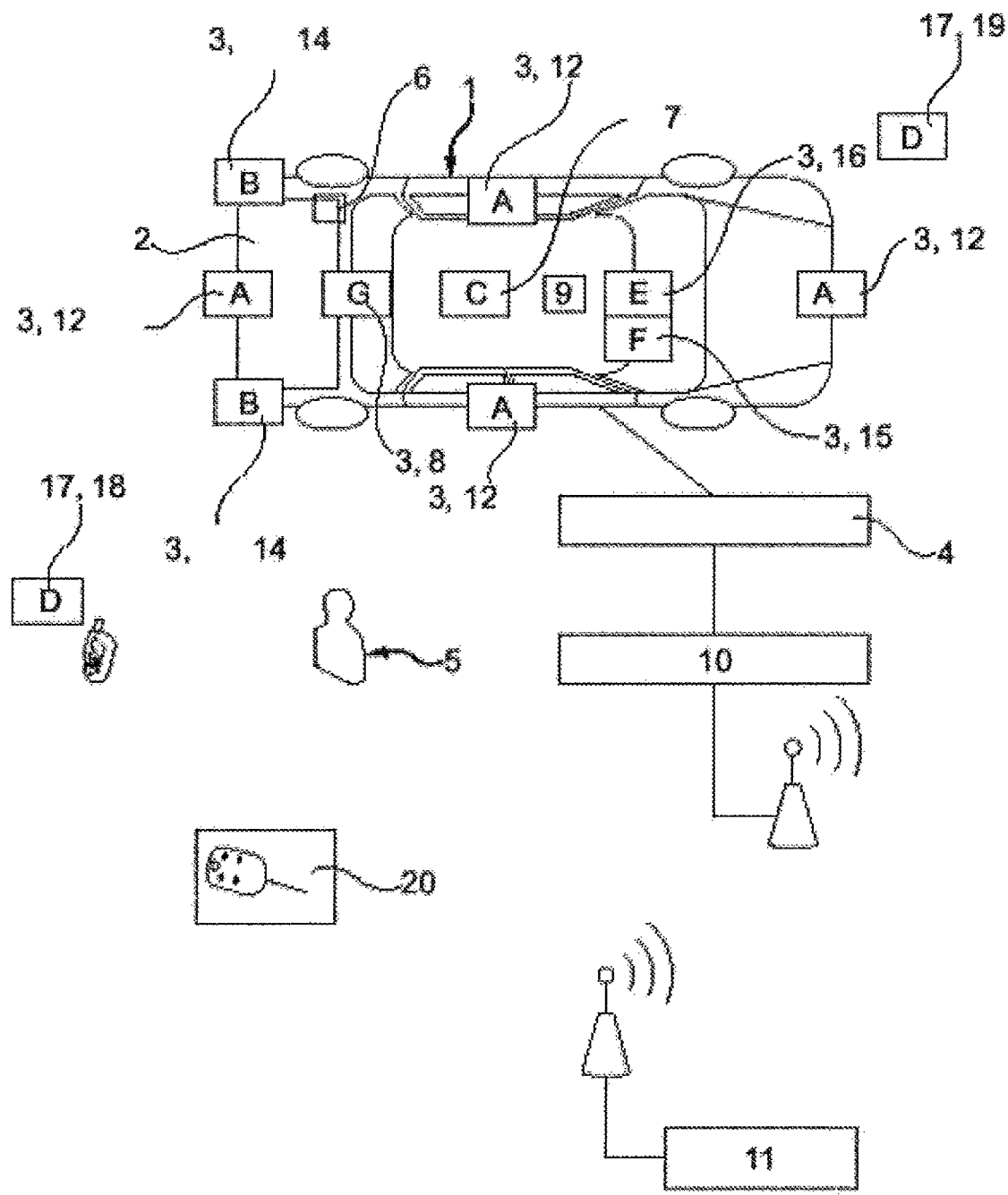
FIG. 1 depicts a motor vehicle for performing an embodiment of the method according to the disclosure.

The motor vehicle 1 shown in FIG. 1 comprises a tailgate 2 that can be operated by remote control. To that extent the motor vehicle 1 is arranged for the implementation of the method according to the disclosure. The motor vehicle 1 comprises a sensor arrangement 3 that detects environmental data of the motor vehicle 1. The motor vehicle also comprises a control apparatus 4 that triggers the opening of the tailgate 2 on receiving a wireless opening signal from an operator 5. Both a corresponding opening movement of the tailgate 2 and also a closing movement in the opposite direction are driven here by a motorized tailgate drive 6. The reception of the wireless opening signal is carried out by means of a signal receiver 7 of the motor vehicle, which is also a component of the sensor arrangement 3. The signals detected by the signal receiver 7 are also considered to be environmental data in the present case.

The sensor arrangement 3 further comprises a proximity sensor 8 that is intended to detect an impending collision during movement of the tailgate 2 by the tailgate drive 6. In such a case, the control apparatus 4 can stop the movement of the tailgate 2. The control apparatus 4 is implemented by a microprocessor system in which a timer is implemented by a suitable computer program.

The motor vehicle 1 further comprises a position determination device 9—in the present case a GPS receiver—that can determine a location of the motor vehicle 1. The motor vehicle 1 also comprises a telecommunications device 10, by means of which a remote server 11 and the data stored on the server 11 can be accessed by means of a wireless radio link, for example based on the LTE (long term evolution) protocol or another mobile radio protocol.

The sensor arrangement 3 of the motor vehicle 1 further comprises a person distance sensor 12, which on its part here and by way of example comprises a parking sensor 13 and a blind spot sensor 14. The parking sensor 13 and the blind spot sensor 14 are primarily used to detect other vehicles or stationary obstacles. In particular, when the motor vehicle 1 is in a parked state—for example with the engine turned off or the ignition switched off—they can be used in the present case and in principle for detecting persons or the operator 5 in the surroundings of the motor vehicle 1. A normally present rain sensor 15 of the motor vehicle 1 is also a component of the sensor arrangement 3. The rain sensor 15 can detect incident rain, which is primarily used for the automatic triggering of the windscreen wipers of the motor vehicle 1.

Finally, the sensor arrangement 3 of the motor vehicle 1 also comprises an operating sensor 16, which is a Bluetooth module in the present case. Said Bluetooth module can communicate with a mobile device 17 of the operator, here by way of example a cell phone 18 or a tablet pc 19 of the operator, by means of the Bluetooth protocols and in particular can determine a distance from the mobile device using the received signal strength. In addition, the motor vehicle 1 can also further comprise types of sensors that are not shown here as components of the sensor arrangement 3, such as for example infrared sensors, acoustic sensors, lidar sensors or microwave-based sensors.

According to one version, the opening signal or closing signal is transmitted in an encoded form by a motor vehicle key 20 with radio remote control functionality and is received by the signal receiver 7. Alternatively, a mobile device 17 in the above sense can also transmit the opening signal 7. Conversely, the motor vehicle key 20 can also be configured as a mobile device 17 in the above sense to the extent that the Bluetooth module or even the signal receiver 7 can determine a distance from the motor vehicle key 20. Consequently, the signal receiver 7 and the operating sensor 16 as well as the mobile device 17 and the transmitter of the opening signal can be identical.

Figure 2:
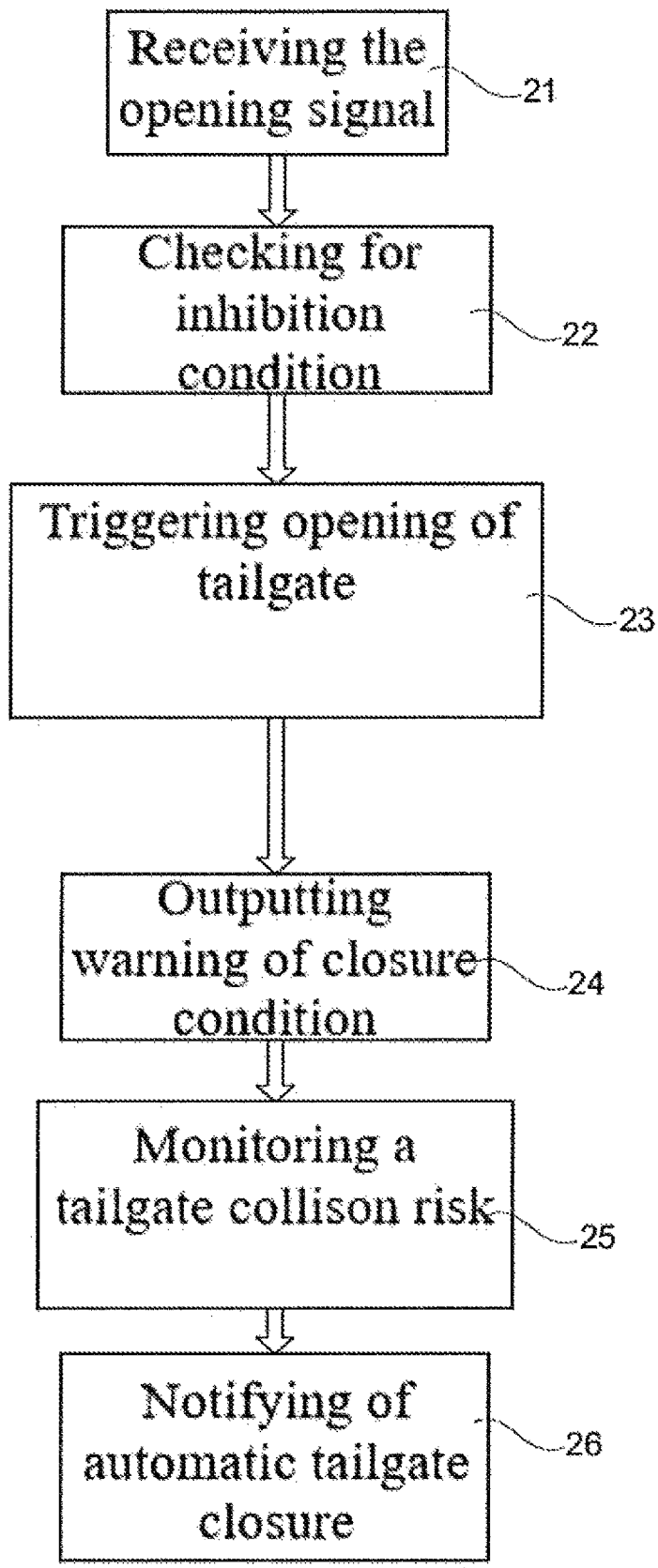
FIG. 2 depicts a flow chart for the embodiment of the method according to the disclosure for the motor vehicle of FIG. 1.

Referring to FIG. 2, a process of an embodiment of the method according to the disclosure is now described. In a first receiving step 21, by means of the signal receiver 7 the control apparatus 4 receives the opening signal, which has been basically triggered by opening the tailgate 2, from the operator's 5 motor vehicle key 20 with radio remote control functionality.

In the subsequent inhibition step 22, a check is now made of whether an inhibition condition exists, wherein if so the opening of the tailgate 2 would be inhibited. Specifically, the control apparatus 4 checks by means of the person distance sensor 12 whether the operator 5 is in the surroundings of the motor vehicle 1 and the distance of the operator 5 from the motor vehicle 1. The control apparatus 4 also checks by means of the operating sensor 16 whether there is a mobile device 17 associated with the operator 5 in the surroundings of the motor vehicle 1. The distance of the mobile device 17 from the motor vehicle 1 may also be determined. In the present case, the person distance sensor 3—here by way of example the parking sensor—determines that a person that is assumed to be the operator 5 is at a short distance from the motor vehicle 1. The operating sensor 16 also determines that the mobile device 17 associated with the operator—here the cell phone 18—is also at a short distance from the motor vehicle 1. Accordingly, it is determined by the control apparatus 4 that the inhibition condition does not exist.

In the subsequent opening step 23, the opening of the tailgate 2 is triggered, so that the tailgate drive 6 drives the tailgate 2 accordingly. The aforementioned timer is also started. Checking for the presence of at least one closure condition is carried out before or during the process of opening the tailgate 2.

Said checking includes the control apparatus 4 accessing server data stored on the server 11 using the location determined by the position determination device 9 and provided by the telecommunications device 10. On the one hand, said server data provide current weather information for the location of the motor vehicle 1. On the other hand, said data also provide a probability factor for a longer opening period of the tailgate 2. In the present case, the weather information indicates rain for the location of the motor vehicle 1, which is confirmed by the rain sensor 15. Because the position is neither a home location of the operator 5 nor a known shopping area, the comparison with the server data gives a low probability factor. Furthermore, it is detected by the operating sensor 16 and the person distance sensor 3 that the cell phone 15 and the operator 5 are remote from the motor vehicle 1.

In the subsequent decision step 24, if there is no change following said circumstances and the timer times out, it is decided that the closure condition exists. The control apparatus 4 causes the output of a warning signal, here an audible signal, to announce the closure process and actuates the tailgate drive 6 to close the tailgate 2. During the subsequent closure step 25, the control apparatus 4 monitors by means of the proximity sensor 8 whether there is a risk of a collision of the tailgate 2 during the closing process.

In the present case, this is not the case, so that the closing process is ended in the subsequent end step 26. The control apparatus 4 then sends a notification regarding the automatically triggered closing of the tailgate 2 to the cell phone 18 of the operator 5. Said transmission can be carried out both by means of the Bluetooth module forming the operating sensor 16 and also alternatively or additionally by means of the telecommunications device 10, i.e. for example, by sending a SMS (short message service).

The closing process is preferably carried out very slowly, for example at a third or even only 10% of the speed of the opening process. A force sensor, for example a torque sensor, is preferably associated with the motor actuating the opening or the closing. If the tailgate 2 encounters an obstacle during the slow closing movement, the force sensor detects this and stops the closing movement. Because of the low speed, as a rule no damage occurs.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method for remote-controlled operation of a tailgate of a motor vehicle comprising:
    detecting environmental data using a sensor arrangement of the motor vehicle;
    opening the tailgate in response to receiving a wireless opening signal, via a control apparatus;
    checking for a presence of at least one closure condition including a timeout of a timer for the tailgate during the opening, the at least one closure condition being independent of a wireless closing signal and based on the environmental data detected by the sensor arrangement;
    inhibiting opening the tailgate if an inhibition condition exists indicating the timeout; and
    closing the tailgate in response to the at least one closure condition being present.

2. The method as claimed in claim 1, wherein the sensor arrangement includes a signal receiver that receives the opening signal and the closing signal, and at least partly detects the environmental data.

3. The method as claimed in claim 1 further comprising monitoring, via the control apparatus, the closing of the tailgate using a proximity sensor of the sensor arrangement for collision avoidance during movement of the tailgate, wherein the proximity sensor at least partly detects the environmental data.

4. The method as claimed in claim 1 further comprising determining a location of the motor vehicle with a position determination device and comparing the determined location with server data for a surrounding of the motor vehicle using a telecommunications device that wirelessly accesses the server data to indicate the presence of the at least one closure condition.

5. The method as claimed in claim 1 further comprising determining a distance from an operator of the control apparatus to a person distance sensor included in the sensor arrangement, wherein checking for the at least one closure condition is based on the distance from the operator to the person distance sensor.

6. The method as claimed in claim 5, wherein the at least one closure condition is based on a change of the determined distance from the operator with time.

7. The method as claimed in claim 1 further comprising determining a distance from a mobile device associated with the operator to an operating sensor included in the sensor arrangement, wherein checking for the at least one closure condition is based on the distance from the mobile device to the operating sensor.

8. The method as claimed in claim 7, wherein the at least one closure condition is based on a change with time of the determined distance from the mobile device.

9. The method as claimed in claim 1 further comprising determining a probability of intention to open the tailgate via the control apparatus and whether the determined probability of intention to open is below a predetermined probability limit.

10. The method as claimed in claim 9, wherein the at least one closure condition exists if the determined probability of intention to open is below the predetermined probability limit.

11. The method as claimed in claim 9 further comprising, in response to reception of the opening signal, checking, via the control apparatus, for an inhibition condition indicating the presence of the at least one closure condition of the tailgate based on the environmental data detected by the sensor arrangement and inhibiting, via the control apparatus, the opening of the tailgate if the inhibition condition exists.

12. The method as claimed in claim 11, wherein the inhibition condition corresponds to one of the other at least one closure conditions.

13. The method as claimed in claim 12, wherein the inhibition condition exists if the determined probability of intention to open is below the predetermined probability limit.

14. A vehicle comprising:
    a sensor arrangement configured to detect environmental data; and
    a control apparatus configured to,
        in response to receiving a wireless opening signal, check for an inhibition condition indicating a closure condition being a timeout of a timer for a tailgate based on the environmental data and inhibit the opening of the tailgate if the inhibition condition exists, and
        in response to receiving a wireless closing signal and a presence of a closure condition of the tailgate independent from the wireless closing signal and based on the environmental data detected by the sensor arrangement, close the tailgate.

15. The vehicle as claimed in claim 14, wherein the control apparatus is further configured to determine a probability of intention to open the tailgate and calculate whether the probability of intention to open is below a predetermined probability limit.

16. The vehicle as claimed in claim 15, wherein the control apparatus is further configured to identify presence of the closure condition if the probability of intention to open is below the predetermined probability limit.

17. A vehicle system comprising: a control apparatus configured to, in response to receiving a wireless opening signal, check for an inhibition condition indicating a timer timeout for a tailgate during the opening and inhibit the opening of the tailgate if the inhibition condition exists, and
    in response to receiving a wireless closing signal and the timeout being independent from the wireless closing signal and detected by a sensor arrangement, close the tailgate.

* * * * *